United States Patent
Hibino et al.

(10) Patent No.: US 8,058,370 B2
(45) Date of Patent: Nov. 15, 2011

(54) PROCESS FOR THE PRODUCTION OF POLYMER MICROPARTICLES

(75) Inventors: Shinji Hibino, Nagoya (JP); Hideo Matsuzaki, Nagoya (JP); Akihiro Gotou, Nagoya (JP)

(73) Assignee: Toagosei Co., Ltd., Tokyo (JP)

( * ) Notice: Subject to any disclaimer, the term of this patent is extended or adjusted under 35 U.S.C. 154(b) by 0 days.

(21) Appl. No.: 12/811,948

(22) PCT Filed: Jan. 22, 2009

(86) PCT No.: PCT/JP2009/050927
§ 371 (c)(1),
(2), (4) Date: Oct. 4, 2010

(87) PCT Pub. No.: WO2009/096301
PCT Pub. Date: Aug. 6, 2009

(65) Prior Publication Data
US 2011/0015364 A1  Jan. 20, 2011

(30) Foreign Application Priority Data
Feb. 1, 2008 (JP) ................. 2008-022295

(51) Int. Cl.
*C08F 2/32* (2006.01)
*C08F 20/00* (2006.01)
(52) U.S. Cl. .............. 526/88; 526/72; 524/801
(58) Field of Classification Search .......... 526/88, 526/72; 524/801
See application file for complete search history.

(56) References Cited

U.S. PATENT DOCUMENTS

| | | | |
|---|---|---|---|
| 5,149,720 A | 9/1992 | DesMarais et al. | |
| 5,827,909 A | 10/1998 | DesMarais | |
| 6,323,250 B1 * | 11/2001 | Kadonaga et al. | 521/64 |

FOREIGN PATENT DOCUMENTS

| | | |
|---|---|---|
| EP | 1 298 146 | 4/2003 |
| JP | 5 222107 | 8/1993 |
| JP | 9 43898 | 2/1997 |
| JP | 10 512187 | 11/1998 |
| JP | 2001 11106 | 1/2001 |
| JP | 2001011106 A * | 1/2001 |
| JP | 2003 26706 | 1/2003 |
| JP | 2003026706 A * | 1/2003 |
| JP | 2003 34725 | 2/2003 |
| JP | 2003 516429 | 5/2003 |
| JP | 2003 301019 | 10/2003 |
| JP | 2004 262747 | 9/2004 |
| JP | 2008 63409 | 3/2008 |

OTHER PUBLICATIONS

U.S. Appl. No. 12/865,028, filed Jul. 28, 2010, Gotou, et al.
U.S. Appl. No. 12/811,658, filed Jul. 2, 2010, Gotou, et al.
U.S. Appl. No. 12/811,385, filed Jul. 1, 2010, Gotou, et al.

* cited by examiner

*Primary Examiner* — Kelechi Egwim
(74) *Attorney, Agent, or Firm* — Oblon, Spivak, McClelland, Maier & Neustadt, L.L.P.

(57) ABSTRACT

The object of the present invention is to provide a process for producing high-quality polymer microparticles having uniform particle size of the order of several micrometers to tens of micrometers by inverse suspension polymerization at high productivity while keeping excellent dispersion stability without causing aggregation among particles. The process is one for the production of polymer microparticles by inverse suspension polymerization of a vinyl monomer and includes steps of preparing in a dispersing tank a water-in-oil (W/O) type emulsion in which an organic solvent is a continuous phase and an aqueous solution of a vinyl-based monomer is a dispersing phase, and conducting the inverse suspension polymerization while feeding the water-in-oil (W/O) type emulsion to a continuous stirred tank reactor.

18 Claims, 6 Drawing Sheets

PROCESS FOR THE PRODUCTION OF POLYMER MICROPARTICLES

FIELD OF THE INVENTION

The present invention relates to a method for producing polymer microparticles. More specifically, the present invention relates to a method for producing high-quality polymer microparticles uniform in particle size having a specific range of particle size by inverse suspension polymerization using a continuous stirred tank reactor of an emulsionized vinyl-based monomer in a dispersing tank, at high productivity, without causing aggregation of particles and in a stable even if the scale is increased.

BACKGROUND ART

Micron-sized spherical polymer microparticles are utilized for cosmetic additives, supports for various chemical materials, spacers, column packings for chromatography, light diffusion agents, porosification agents, weight-lightening agents, antiblocking agents, surface modification agents for recording paper, and the like.

Among these, hydrophilic crosslinked polymer microparticles can be used as a hydrous gel microparticle, and is useful as cosmetics additives, supports, porosification agents, weight-lightening agents, and surface modification agents for recording paper.

Production of polymer particles by inverse suspension polymerization of a vinyl-based monomer has conventionally been carried out. As technologies of producing hydrophilic crosslinked polymer particles by inverse suspension polymerization, there have been known a method in which a water-in-oil microdispersed droplet of a monomer is formed using a compound having a specific HLB as a dispersing agent before polymerization and then the monomer is polymerized while dropping it (see Patent Document 1), a method in which inverse suspension polymerization is carried out in the presence of a water-absorptive polymer particle, an oil-soluble polymerization initiator and a dispersing agent, and during or after the polymerization a hydrophobic vinyl-based monomer and an oil-soluble polymerization initiator are added to perform polymerization (see Patent Document 2), a method in which a hydrophilic vinyl-based monomer is inverse suspension polymerized in the presence of a silicone compound having at least one functional group in the reaction system (see Patent Document 3), and the like.

However, these conventional techniques include a semi-batchwise operation, which has an intermediate character between batchwise (batch) operation and continuous operation. Therefore, there are problems that the dispersion stability of polymer particles during or after polymerization is not sufficient, the particle size of polymer particles obtained is nonuniform, and the hydrophilicity of polymer particles obtained is degraded. In particular, when hydrophilic particles with a high degree of crosslinking are produced while increasing the proportion of a multifunctional vinyl-based monomer used, polymerization stability is significantly degraded, and problems such as aggregation of particles, degradation in the quality of polymer particles obtained, and a reduction in productivity easily occur.

Since all the above-mentioned production methods are ones in which polymerization is performed by feeding a monomer emulsion continuously over one hour or more to a reactor heated to a high temperature of 70° C. or higher without discharging polymer microparticles, and aging naturally in the tank, aggregation of particles or the like easily occurs and the particle size of the resulting polymer particles becomes irregular. In addition, when a large amount of a crosslinking agent such as a multifunctional vinyl-based monomer, is used, most part of unreacted crosslinking agent becomes easy to flow out into a continuous phase side, and when polymerization is continued in this state, particles aggregate more and this is expected to lead to the aforementioned deterioration in quality of polymer particles.

Furthermore, Patent Document 4 discloses an absorptive polymer particle which is produced by inverse suspension polymerization using a redox polymerization initiator for the production of a water absorptive polymer having a specific water absorptivity, and a polymer particle is produced by feeding tert-butyl hydroxyperoxide which is an oil-soluble oxidizing agent, and then feeding sodium bisulfite which is a water-soluble reducing agent.

According to this production method, particle size control of microparticles can be performed more precisely in comparison to aforementioned conventional technologies. Since a polymerization reaction occurs before the water-soluble reducing agent is diffused sufficiently, this is not satisfactory as a method for producing a high-quality particle that is uniform in particle size and has a particle size falling within a specified range, in a stable state without causing, for example, aggregation of particles.

The above-mentioned conventional method is a batch production system. Therefore, when larger amount of a monomer is charged for one time reaction, its reaction liquid is brought to a boil by polymerization heat, and then, inside of the reactor is pressurized, being dangerous. Accordingly, it is required to produce it within safe limits while controlling a balance between polymerization heat and heat capacity of a raw material including a solvent, water, and the monomer, and there has been a problem that the method has low productivity because the amount of obtained product one time reaction is restricted to low.

Meanwhile, a continuous polymerization apparatus with a reactor containing a dispersion medium therein as well as a monomer feed port located at the top of the reactor and a polymer discharge port at the bottom of the reactor are provided is known in Patent Document 6, related to continuation of suspension polymerization to increase productivity.

However, the above-mentioned reactor is a tubular reactor and has a structure that does not stir its content during polymerization, which is unsuitable for the continuous inverse suspension polymerization. Therefore, the reactor is not an apparatus capable of producing high-quality polymer microparticles having uniform particle size in a particular diameter range.

With regard to the definition of a reaction apparatus, the continuous operation is an operating method in which a raw material for the reaction is continuously supplied from an inlet port of the reactor and the product is continuously drawn from an outlet port of the reactor, and the both tank and tubular reactors can be operated continuously, as described in "Han-no Kogaku" (Baifukan Co., Ltd). Meanwhile, the semi-batchwise operation has an intermediate character between batchwise operation and continuous operation. For example, when one component B of a raw material is charged into a vessel type reactor in advance, and then, another raw material component A is continuously or intermittently flowed into the reactor to progress the reaction, it is considered that the reaction is a batchwise operation for the component B, and the reaction is a continuous operation for the component A. Therefore, techniques in Patent Documents 1 to 3 include a semi-batchwise operation.

Patent Document 1:JP-A H05-222107
Patent Document 2:JP-A 2003-301019
Patent Document 3:JP-A 2003-34725
Patent Document 4:JP-A 2004-262747
Patent Document 5:JP-A H09-43898

DISCLOSURE OF THE INVENTION

Problems That the Invention is To Solve

The object of the present invention is to provide a method for the production of high-quality polymer microparticles uniform in particle size having a particle size of the order of several micrometers to tens of micrometers at high productivity while keeping excellent dispersion stability without causing aggregation of particles by continuous inverse suspension polymerization using a continuous stirred tank reactor.

In particular, the present invention is one to provide a method in which high-quality polymer microparticles uniform in particle size can be smoothly produced at high productivity while keeping high polymerization stability and suspension stability even if hydrophilic particles having a high degree of crosslinking are produced.

Means For Solving the Problems

The present inventors have engaged in an intensive investigation in order to attain the above objects. The inventors have studied conditions in particular for the continuous inverse suspension polymerization which is more excellent in productivity than conventional batch production system when the vinyl-based monomer is subjected to inverse suspension polymerization for the production of polymer microparticles. As a result, when a vinyl-based monomer and the like are emulsified into water-in-oil (W/O) state in a dispersing tank, in advance, and then, the emulsion is subjected to continuously polymerization in a continuous stirred tank reactor, it is found that high-quality spherical particles having a particle size of the order of several micrometers to tens of micrometers and being uniform in particle size can be produced at higher productivity while keeping excellent dispersion stability and polymerization stability without causing aggregation, clumping, and adhesion to a polymerization apparatus of polymer particles during or after polymerization.

The present invention for solving the above-mentioned problems is as follows.

The first invention is a method for the production of polymer microparticles by inverse suspension polymerization of a vinyl-based monomer, characterized by preparing in a dispersing tank a water-in-oil (W/O) type emulsion in which an organic solvent is a continuous phase and an aqueous solution of a vinyl-based monomer is a dispersing phase, and conducting the inverse suspension polymerization while feeding the water-in-oil (W/O) type emulsion to a continuous stirred tank reactor.

The second invention is a method for the production of polymer microparticles according to the first invention, wherein a redox polymerization catalyst is used as a polymerization initiator.

The third invention is a method for the production of polymer microparticles according to the second invention, wherein an oxidizing agent in the redox polymerization catalyst is an oil-soluble oxidizing agent.

The fourth invention is a method for the production of polymer microparticles according to any one of the first to third inventions, wherein a reaction tank having at least two continuous stirred tank reactors serially-connected is used.

The fifth invention is a method for the production of polymer microparticles according to any one of the first to fourth inventions, wherein a residence time of a reaction liquid in at least first reaction tank is ten minutes or shorter.

The sixth invention is a method for the production of polymer microparticles according to any one of the first to fifth inventions, wherein a ratio of the dispersing phase in each reaction liquid in the respective reaction tank is 30% or less by volume.

The seventh invention is a method producing polymer microparticles according to any one of the first to sixth inventions, wherein the water-in-oil (W/O) type emulsion is prepared using a dispersing tank which has at least one stirring apparatus and at least one membrane emulsification apparatus.

The eighth invention is a method producing polymer microparticles according to any one of the first to seventh inventions, wherein the water-in-oil (W/O) emulsion is deaerated in any step after passing the membrane emulsification apparatus.

The ninth invention is a method for the production of polymer microparticles according to any one of the first to eighth inventions, wherein a continuous phase component is continuously fed to a wall of a gas phase of the continuous stirred tank reactor.

The tenth invention is a method for the production of polymer microparticles according to any one of the first to ninth inventions, wherein an oxidizing agent or a reducing agent is mixed with the water-in-oil (W/O) emulsion in the dispersing tank.

The eleventh invention is a method for the production of polymer microparticles according to any one of the first to tenth inventions, wherein a water-in-oil (W/O) emulsion is prepared which has an average particle size of the dispersing phase of 100 µm or less in the dispersing tank.

The twelfth invention is a method for the production of polymer microparticles according to any one of the first to eleventh inventions, wherein a macromonomer having a radically polymerizable unsaturated group at an end of a polymer derived from a vinyl-based monomer is used as a dispersion stabilizer.

The thirteenth invention is a method for the production of polymer microparticles according to any one of the first to twelfth inventions, wherein at least one part of the vinyl-based monomer has a polar group selected from the group consisting of a carboxyl group, a sulfone group and an amide group.

The fourteenth invention is a method for the production of polymer microparticles according to any one of the first to thirteenth inventions, wherein the vinyl-based monomer contain a multifunctional vinyl monomer having two or more radical polymerizable unsaturated groups.

The fifteenth invention is a method for the production of polymer microparticles according to the fourteenth invention, wherein a molar ratio of a monofunctional vinyl monomer and the multifunctional vinyl monomer is 100:0.1 to 100:10.

The sixteenth invention is a method for the production of polymer microparticles according to any one of the first to fifteenth inventions, wherein the polymer microparticle produced by inverse suspension polymerization are polymer microparticles having a crosslinking density of 0.5% or more by mol.

The seventeenth invention is a method for the production of polymer microparticles according to any one of the first to sixteenth inventions, wherein the polymer microparticles produced by inverse suspension polymerization are polymer microparticles which have an average particle size in a saturated water-swollen state of 2 to 100 µm, and a content ratio of particles having a particle size of 150 µm or larger in a saturated water-swollen state of 1.0% or less by weight.

The eighteenth invention is a method for the production of polymer microparticles according to any one of the first to sixteenth inventions, wherein the polymer microparticles produced by inverse suspension polymerization are polymer microparticles which have a water absorption ratio of 5 to 50 times, an average particle size in a saturated water-swollen state of 5 to 70 μm, and a content ratio of particles having a particle size of 150 μm or larger in a saturated water-swollen state of 0.3% or less by weight.

Effect of the Invention

According to the production method of the present invention, high-quality spherical hydrophilic polymer microparticles remarkably higher uniform in particle size than those by conventional technologies can be produced at high productivity while keeping high dispersion stability and polymerization stability without causing aggregation, clumping and adhesion to a polymerization apparatus of particles during or after polymerization, in comparison with a batch-wise process. Moreover, according to the production method of the present invention, even if hydrophilic particles having a high degree of crosslinking are produced using a large amount of a multifunctional vinyl-based monomer, high-quality hydrophilic crosslinked polymer microparticles uniform in particle size can be produced without causing aggregation, clumping and adhesion to a polymerization apparatus of particles. Furthermore, when the production is carried out under conditions of an increased scale for increasing the productivity, the production method of the present invention can lead to high-quality polymer microparticles.

Since the polymerization reaction can be conducted in a reactor having a smaller volume than that of batch production system according to the continuous inverse suspension polymerization of the present invention, polymer microparticles having particle size distribution with a sharp peak can be obtained.

BEST MODE FOR CARRYING OUT THE INVENTION

1: burette, 2: pinch cock, 3: silicone tube, 4: polytetrafluoroethylene tube, 5: funnel, 6: sample (polymer microparticles), 7: filter paper for fixing sample (polymer microparticles), 8: supporting cylinder, 9: adhesive tape, 10: filter paper for device, 11: lid, 12: ion exchange water,

13: first dispersing tank, 14: second dispersing tank, 15: first reaction tank, 16: second reaction tank, 17: third reaction tank, 18: oil phase supplying pipe, 19: aqueous phase supplying pipe, 20: oxidizing agent supplying pipe, 21: reducing agent supplying pipe, 22: additional catalyst supplying pipe, 23: additional catalyst supplying pipe, 24: polymer microparticles solution sending pipe, 25: oil phase component supplying pipe for washing.

BEST MODE FOR CARRYING OUT THE INVENTION

Hereinafter, the embodiments of the present invention are described in detail.

The "inverse suspension polymerization of a vinyl-based monomer" according to the present invention means a polymerization using an oil phase as a dispersion medium and an aqueous phase as a dispersoid. In general, in the case where polymerization is performed using a hydrophilic vinyl-based monomer, particles are produced by water-in-oil (W/O) type inverse suspension polymerization in which an aqueous phase (an aqueous solution of the hydrophilic vinyl-based monomer) is suspended in the form of droplets in an oil phase (a dispersion medium composed of a hydrophobic organic solvent).

The inverse suspension polymerization of a vinyl-based monomer in the present invention is one in which the vinyl-based monomer is subjected to inverse suspension polymerization while continuously supplying a prepared water-in-oil type emulsion in advance to the continuous stirred tank reactor and discharging continuously.

Figure 6:
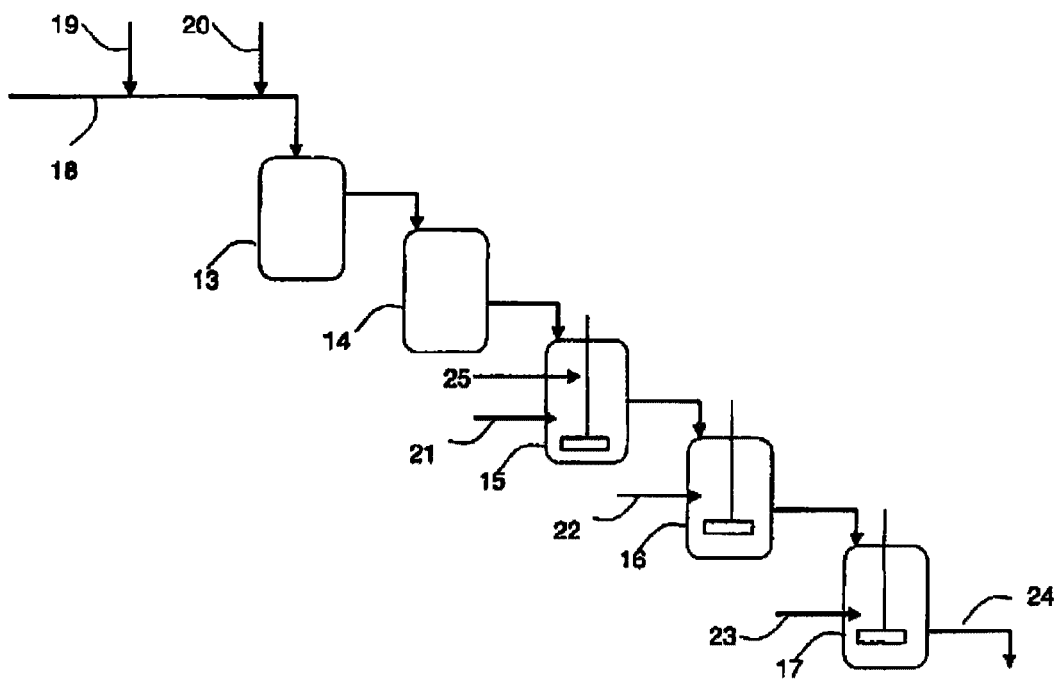
FIG. 6 is a flow diagram showing serially-connected continuous stirred tank reactors.

In the preferable production method of the present invention, a continuous reaction apparatus is used shown in FIG. 6, a continuous phase (oil phase) obtained by a dispersion stabilizer and an organic solvent, and an aqueous solution of a vinyl-based monomer (dispersing phase) are used to prepare a water-in-oil type emulsion in a dispersing tank (13: first dispersing tank and 14: second dispersing tank) in advance, a dispersion liquid (emulsion) containing an oxidizing agent is continuously supplied into a continuous stirred tank reactor (15: first reaction tank), and then, a reducing agent is supplied to the continuous stirred tank reactor to initiate polymerization. Polymerization reaction is performed by continuously transferring the reaction liquid overflowed from the first reaction tank to the second reaction tank, and then, the third reaction tank. An oxidizing agent is added to the second and third reaction tanks to increase a polymerization rate as needed.

The dispersion tank is preferably one having a dispersion tank having at least one stirring apparatus and a dispersion tank having at least one membrane emulsification apparatus. For the purpose of preparing a water-in-oil (W/O) type emulsion with uniform particle size, and also, a multi-stage dispersion tank is preferably used.

Examples of the stirring apparatus include a stirring machine having mixing blades, a homogenizer, a stirring machine using sonication, an emulsifier and the like. Among these, a dispersion tank having an emulsifier and a dispersion tank having a membrane emulsification apparatus is preferably used in multi-stages.

A dispersed droplet having a certain size is formed using an emulsifier and the size of the vinyl-based monomer drop is adjusted using a membrane emulsification apparatus. A membrane emulsification apparatus is one to pass a water-in-oil (W/O) type emulsion through a hydrophobic microporous membrane, and then, to obtain a more microparticulated water-in-oil (W/O) type emulsion. The size of the drop of the vinyl-based monomer can be adjusted with a combination of a stirring revolution speed of the emulsifier and a pore size of the microporous membrane of the membrane emulsification apparatus. And, polymer microparticles can be obtained initiating the polymerization by the continuous stirred tank reactor.

In the present invention, for the purpose of producing high-quality polymer microparticles uniform in particle size having a particle size of the order of several micrometers to tens of micrometers, a water-in-oil (W/O) type emulsion having the average size of the dispersing phase of 100 µm or smaller is preferably contained in the dispersing tank.

The vinyl-based monomer for the inverse suspension polymerization according to the present invention is not particularly limited so long as it is a radically polymerizable vinyl-based monomer. For example, a hydrophilic monomer having a hydrophilic group such as a carboxyl group, an amino group, a phosphoric acid group, a sulfonic acid group, an amide group, a hydroxyl group, a quaternary ammonium group or the like can be used. Among these, when a monomer having a carboxyl group, a sulfonic group or an amide group is used, polymer microparticles high in hydrophilicity and excellent in water absorption capacity and water-retaining property can be obtained, being preferable.

Specific examples of the hydrophilic vinyl-based monomer include a vinyl-based monomer having a carboxyl group or its (partially) alkali-neutralized product, such as (meth) acrylic acid, crotonic acid, itaconic acid, maleic acid, fumaric acid, monobutyl itaconate, monobutyl maleate and cyclohexanedicarboxylic acid; a vinyl-based monomer having an amino group or its (partially) alkali-neutralized product or its (partially) quaternary product, such as N,N-dimethylaminoethyl(meth)acrylate, N,N-diethylaminoethyl(meth)acrylate, N,N-dimethylaminoepropyl(meth)acrylate, and N,N-dimethylaminopropyl(meth)acrylamide; N-vinylpyrrolidone, acryloylmorpholine; a vinyl-based monomer having a phosphoric acid group, or its (partially) alkali-neutralized product, such as acid phosphoxyethyl methacrylate, acid phosphoxypropyl methacrylate, and 3-chloro-2-acid phosphoxypropyl methacrylate; a vinyl-based monomer having a sulfonic acid group or phosphonic acid group, or its (partially) alkali-neutralized product, such as 2-(meth)acrylamide-2-methylpropanesulfonic acid, 2-sulfoethyl(meth)acrylate, 2-(meth)acryloylethanesulfonic acid, allylsulfonic acid, styrene sulfonic acid, vinylsulfonic acid, allylphosphonic acid, and vinylphosphonic acid; a nonionic hydrophilic monomer such as (meth)acrylamide, N,N-dimethyl acrylamide, N-isopropyl acrylamide, N-methylol(meth)acrylamide, N-alkoxymethyl (meth)acrylamide, (meth)acrylonitrile, hydroxyethyl(meth) acrylate, hydroxypropyl(meth)acrylate and the like. These compounds may be used singly or in combination of two or more types thereof.

Using a compound selected from (meth)acrylic acid, (meth)acrylamide and 2-acrylamide-2-methylpropanesulfonic acid singly or in combination of two or more types for the inverse suspension polymerization is preferable from the viewpoint that polymerizability is excellent and resulting particles are excellent in water absorption property. The particularly preferred is (meth)acrylic acid.

In the present invention, a multifunctional vinyl-based monomer having two or more radically polymerizable unsaturated groups may be used as a vinyl-based monomer together with at least one of the above-mentioned monofunctional hydrophilic vinyl-based monomer for the inverse suspension polymerization.

Therefore, the "vinyl-based monomer" according to the present invention is a general term for the monofunctional vinyl-based monomer and the multifunctional vinyl-based monomer.

The multifunctional vinyl-based monomer is not particularly limited so long as it has two or more groups radically polymerizable with the above-mentioned hydrophilic vinyl-based monomer, and specific example thereof includes a di-or tri-(meth)acrylate of a polyol, such as polyethylene glycol di(meth)acrylate, polypropylene glycol di(meth)acrylate, glycerin tri(meth)acrylate, trimethylolpropane tri(meth)acrylate, and a tri(meth)acrylate of a modified trimethylolpropane ethylene oxide; a bisamide such as methylenebis(meth)acrylamide; divinyl benzene, allyl(meth)acrylate, and the like. These compounds may be used singly or in combination of two or more types thereof.

Among these, polyethylene glycol diacrylate and methylene bisacrylamide are suitably used as the multifunctional vinyl-based monomer because it excels in solubility in a mixed liquid of water and a base-forming hydrophilic vinyl-based monomer and it is advantageous in being used in an amount increased for obtaining a high degree of crosslinking. The particular preferred is polyethylene glycol di(meth)acrylate.

The amount of the multifunctional vinyl-based monomer to be used depends on the type of the vinyl-based monomer to be used and the intended application of resulting particles. When the polymer particles are required to have crosslinked characteristics, the amount thereof is preferably in the range from 0.1 to 10 mol, more preferably from 0.2 to 8 mol, and further preferably from 0.5 to 5 mol based on 100 mol of the total amount of the monofunctional vinyl-based monomer to be used.

Examples of the hydrophobic organic solvent that forms an oil phase (dispersion medium) in the inverse suspension polymerization according to the present invention include an aliphatic hydrocarbon solvent having 6 or more carbon atoms; an aromatic hydrocarbon solvent such as benzene toluene, xylene and ethyl benzene; a silicone-based solvent such as octamethylcyclotetrasiloxane, and the like. In particular, hexane, cyclohexane, and n-heptane are suitably used because the solubilities of vinyl-based monomer and water in the solvent are small and they can be removed easily after polymerization.

In the inverse suspension polymerization according to the present invention, a hydrophilic vinyl-based monomer (and a neutralized salt thereof) is preferably dissolved in water to form an aqueous solution and then is added to the polymerization system. The concentration of the hydrophilic vinyl-based monomer in the aqueous solution in which the hydrophilic vinyl-based monomer is dissolved is preferably in the range from 5% to 80% by weight, and particularly from 20% to 60% by weight from the viewpoint that the inverse suspension polymerization proceeds smoothly and the productivity is good.

In the case where the hydrophilic vinyl-based monomer for the inverse suspension polymerization is a vinyl-based monomer having an acidic group such as a carboxyl group and a sulfonic acid group, when the hydrophilic vinyl-based monomer is added to water and the acidic group in the vinyl-based monomer is neutralized with an alkali aqueous solution such as aqueous ammonia, an aqueous sodium hydroxide solution, and an aqueous potassium hydroxide solution, an aqueous solution can be prepared in which the vinyl-based monomer is dissolved sufficiently.

In the producing method of the present invention, a dispersion stabilizer is an essential component.

Specific examples of the dispersion stabilizer include a macromonomer type dispersion stabilizer, and a nonionic surfactant such as a sorbitan fatty acid ester, a polyglycerol fatty acid ester, a sucrose fatty acid ester, sorbitol fatty acid ester and a polyoxyethylene alkyl ether.

Among these, a macromonomer type dispersion stabilizer is preferable. The macromonomer type dispersion stabilizer is a vinyl-based monomer-derived polymer having, at an end thereof, a radically polymerizable unsaturated group.

Moreover, it is preferable to use a relatively high hydrophobic nonionic surfactant having an HLB of 3 to 8, such as sorbitan monooleate and sorbitan monopalmitate, together with a macromonomer type dispersion stabilizer. These surfactants may be used singly or in combination of two or more types thereof.

The preferable macromonomer as the above-mentioned macromonomer type dispersion stabilizer are a macromonomer having an α-substituted vinyl group represented by the following formula (1), at an end of a polymer obtained by radical polymerization of a vinyl-based monomer at a temperature range of 150° C. to 350° C., and/or a macromonomer having a (meth)acryloyl group at an end of a polymer derived from a vinyl-based monomer.

$$H_2C = C(X) - \quad (1)$$

(In the formula, X is a monovalent polar group.)

These macromonomers are excellent as a dispersion stabilizer and preferable. The weight average molecular weight of the macromonomer is preferably in the range from 1,000 to 30,000. The macromonomer preferably has both structural units derived from a hydrophilic vinyl-based monomer and a hydrophobic vinyl-based monomer. The structural unit derived from the hydrophobic vinyl-based monomer is preferably a structural unit derived from a (meth)acrylic acid alkyl ester having 8 or more carbon atoms, and the structural unit derived from the hydrophilic vinyl-based monomer is preferably a structural unit derived from a vinyl-based monomers having a carboxyl group.

In particular, when the hydrophilic particles are produced by the inverse suspension polymerization of a vinyl-based monomer using a macromonomer type dispersion stabilizer, it is preferable to use a multifunctional vinyl-based monomer together with a monofunctional compound. Thereby hydrophilic particles having improved strength and shape retainability can be obtained.

The dispersion stabilizer is preferably added to a polymerization system after being dissolved or uniformly dispersed in a hydrophobic organic solvent that is a dispersion medium (oil phase).

The amount of the dispersion stabilizer to be used is preferably in the range from 0.1 to 50 parts by weight, more preferably from 0.2 to 20 parts by weight, and further preferably from 0.5 to 10 parts by weight based on 100 parts by weight of the total amount of the vinyl-based monomer in order to obtain hydrophilic polymer microparticles uniform in particle size while maintaining excellent dispersion stability. If the amount of the dispersion stabilizer used is too small, the dispersion stabilities of the vinyl-based monomer and formed polymer microparticles in the polymerization system becomes poor, and the formed particles easily aggregate, precipitate, and have variation in particle size. On the other hand, if the amount of the dispersion stabilizer used is too large, the amount of the microparticles (having size of 1 μm or smaller) by-produced may be increased.

In the inverse suspension polymerization according to the present invention, it is preferable to carry out the polymerization so that the weight ratio of an oil phase (dispersion medium) to an aqueous phase (dispersoid) in the polymerization system may become from 99:1 to 20:80, and particularly 95:5 to 30:70, from the viewpoint that productivity, dispersion stability during polymerization, and control of particle size of the polymer microparticles can be satisfied at the same time. It is noted that the aqueous phase (dispersoid) means a sum of the vinyl-based monomer and water before polymerization, and produced polymer microparticles and water.

In the inverse suspension polymerization, it is required that a dispersion stabilizer is contained in a hydrophobic organic solvent forming a continuous phase (oil phase) and that an aqueous solution of a vinyl-based monomer is prepared for a dispersing phase and a water-in-oil (W/O) type emulsion is prepared in the dispersion tank in advance. The polymerization reaction is initialized feeding the water-in-oil (W/O) type emulsion into the continuous stirred tank reactor continuously.

The inverse suspension polymerization according to the present invention is preferably carried out under stirring. As the stirring blade, an anchor blade and a paddle blade are preferable, and a paddle blade is particularly preferred. Generally, suspension polymerization is influenced by stirring power. If the stirring power is excessively low, polymer microparticles having a desired particle size cannot be obtained or it is impossible to inhibit an aqueous solution of monomers from merging, and, as a result, problems may arise, such as that perfectly spherical microparticles can not be obtained or that many aggregated particles are formed.

In the present invention, the stirring power per unit volume in the continuous stirred tank reactor is preferably 0.5 kw/m³ or higher, and particularly 1.0 kw/m³ or higher.

In the inverse suspension polymerization according to the present invention, a redox polymerization initiator including an oxidizing agent and a reducing agent is used as a polymerization initiator. A redox reaction makes it possible to proceed a polymerization initiation at a low temperature, increase the concentration of a vinyl-based monomer in a polymerization reaction liquid and increase the polymerization rate. Therefore, the productivity can be improved and the molecular weight of a polymer formed can be higher.

The oxidizing agent is preferably an oil-soluble oxidizing agent. As mentioned above, a hydrophobic organic solvent in which a dispersion stabilizer is dissolved is used as a continuous phase (oil phase) in the inverse suspension polymerization. The oil-soluble oxidizing agent means an oxidizing agent that is capable of being dissolved in the continuous phase.

Particularly, the oil-soluble oxidizing agent is preferably a compound having an octanol/water partition coefficient (logPow) provided in Japanese Industrial Standards Z7260-107 or OECD TEST Guideline 107 of preferably −1.4 or more, more preferably 0.0 or more, and further preferably 1.0 or more.

Specific example thereof includes an organic peroxide such as tert-butyl hydroperoxide (logPow=1.3), di-tert-butyl hydroperoxide, tert-hexyl hydroperoxide, di-tert-amyl hydroperoxide, cumene hydroperoxide (logPow=2.2), dicumyl peroxide (logPow=5.5), tert-butyl cumyl peroxide, tert-butyl peroxy pivalate, benzoyl peroxide (logPow=3.5), and lauroyl peroxide. Among these, tert-butyl hydroperoxide and cumene hydroperoxide are preferable. The particular preferred is cumene hydroperoxide.

Conventionally known reducing agents can be used as the reducing agent. Among these, sodium sulfite, sodium hydrogensulfite, and sodium hydrosulfite are preferable. Particularly preferred is sodium hydrosulfite.

The method for feeding the oxidizing agent and reducing agent is preferably one in which any one of the oxidizing agent and reducing agent is charged into the water-in-oil (W/O) type emulsion prepared in the dispersion tank to mix therewith, on the other hand, other initiator is supplied to the continuous stirred tank reactor to initiate polymerization. Particularly preferred is a method in which an oxidizing agent is mixed with the water-in-oil (W/O) type emulsion in advance and a reducing agent is supplied to the continuous stirred tank reactor.

The amount of the polymerization initiator to be used may be adjusted according to the types of the vinyl-based monomer and the particle size and molecular weight of the resultant polymer microparticles. The amount of the oxidizing agent is in the range from 0.001 to 0.15 mol, and particularly from 0.003 to 0.07 mol based on 100 mol of the total of the vinyl-based monomer.

Additionally, the ratio of the oxidizing agent and the reducing agent is not particularly limited. The molar ratio of the water-soluble oxidizing agent to the water-soluble reducing agent is preferably 1.0 to 0.25-15.0, and particularly 1.0 to 1.0-10.0.

If the ratio is outside that range, the unfavorable may be occurred. Example thereof includes a generation of aggregates caused by lowering of the reaction rate of monomers, shortening of the chain of polymer constituting particles, remaining of a catalyst after the completion of polymerization; and the like.

In the inverse suspension polymerization according to the present invention, the temperature of the reaction liquid at the time of starting the polymerization is preferably in the range from 0° C. to 40° C., more preferably from 5° C. to 30° C., and particularly from 10° C. to 25° C. If the reaction start temperature is lower than 0° C., freezing of a polymerization facility or a reaction solution becomes a problem and a large cost is required for cooling. On the other hand, if the reaction start temperature exceeds 40° C., it is necessary, from a safety aspect, to reduce the amount of monomers to be fed, resulting in a large production cost.

When the continuous stirred tank reactors are serially-connected, a residence time in the reactor can be shortened and a frequency of coalescence between the polymer microparticles and a vinyl-based monomer in the reactor can be reduced, thereby generation of aggregates during the polymerization can be prevented. It is preferable to use two and more tank reactors serially-connected, and more preferable to use two and more tank reactors serially-connected.

In the inverse suspension polymerization according to the present invention, it is desirable to prevent generation of aggregates during the polymerization by reducing the residence time in each reactor as short as possible to decrease the frequency of coalescence between the polymer microparticles and a vinyl-based monomer in the reactor. In addition, when the residence time is shortened, the reactor volume can be reduced, and broadening of particle size distribution caused by scale-up can be also prevented.

For each reactor, the residence time of at least the first reaction tank is preferably 10 minutes or shorter, more preferably 5 minutes or shorter, and particularly 30 seconds or shorter. If the residence time excesses beyond 10 minutes, generation of aggregates during the polymerization may be increased. On the other hand, if the residence time is excessively short, a polymerization rate is reduced and more reactor stages are required. Therefore, it is preferred that the residence time is 15 seconds and longer.

Further, for the purpose of preventing from forming aggregates during the polymerization caused by coalescence between the monomers and between the polymer microparticles and a monomer as well as coarse single particles in the reactor, the volume ratio of the dispersing phase in the reactor is preferably in the range from 5% to 30%, and more preferably from 20% to 25%. If the volume ratio of the dispersing phase in the reactor exceeds 30%, the amount of the generated aggregates during the polymerization may be increased. On the other hand, if the volume ratio of the dispersing phase is less than 5%, the productivity is reduced, being undesirable.

If oxygen is existed during the redox inverse suspension polymerization, the polymerization may be inhibited. Therefore, it is desired to remove oxygen.

Examples of the removing oxygen include a replacing of oxygen with nitrogen in the system by nitrogen-bubbling. A vinyl-based monomer preparing tank for preparation of the vinyl-based monomer material or a vinyl-based monomer supply tank may be deaerated in advance, but there is a risk of abnormal polymerization in this way. Further, the vinyl-based monomer can be deaerated by flowing nitrogen into a supply line of the vinyl-based monomer to the dispersion tank; however, adjustment of the size of monomer drops by changing the pore size of microporous membrane may not always be effective because monomer drops are microparticulated by mixing with nitrogen when nitrogen is provided into the membrane emulsification apparatus. Accordingly, it is preferable to deaerate by nitrogen-bubbling after passing through the microporous membrane.

In the production of polymer microparticles, attachment of the polymer to a wall of the reactor often becomes a problem. The polymer microparticles can be removed with a dispersion medium (continuous phase), therefore, it is preferable to continuously provide the dispersion medium on the wall of the gas phase of the reactor and wash the wall with the medium. The method to provide the dispersion medium (continuous phase), which is a wash, is preferably a way using a spray, a ring etc., and more preferably a way that spray the wash onto the wall surface by providing the wash to a dispersion plate attached to a stirring shaft.

In the production method of the present invention, the average particle size of the resultant polymer microparticles is preferably in the range from 2 to 150 μm, more preferably from 2 to 100 μm, and further preferably from 5 to 70 μm. If the average particle size is smaller than 2 μm, the slipping property or blocking preventing function may be insufficient. If it exceeds 150 μm, an problem such as unfavorable appearance, deterioration of touch feeling and lowering of the strength after incorporating materials may be occurred. When the size of the polymer microparticles becomes smaller, the stabilizing effect of the dispersion stabilizer comes to be needed more because the interfacial area between a continuous phase and a dispersing phase becomes larger.

As to the size of the polymer microparticles, the size under a condition where the particles are used becomes important. When the polymer microparticles are used as water-swollen particles, it is preferable that the size when the particles are swollen with water be within the above-mentioned range.

The polymer microparticles are preferably crosslinked. As mentioned above, the crosslinking structure of a polymer constituting the microparticles is based on copolymerization of a multifunctional vinyl-based monomer.

It is also possible to adjust the degree of crosslinking by reacting a crosslinking agent after polymerizing a vinyl-based monomer having a functional group by the inverse suspension polymerization. For example, there is a method in which polymer microparticles of a monomer having a carboxyl group is subjected to crosslinking with ethylene glycol diglycidyl ether.

Alternatively, a polymer can be crosslinked by a known method such as ionic bond type crosslinking via a multivalent metal ion and covalent bond type crosslinking in which crosslinking is achieved by application of radiation.

When the polymer microparticles according to the above-mentioned crosslinking method are having a crosslink density of 0.5% or more by mol, the particle can exert its characteristics in various applications mentioned above. Therefore, it is preferable that the polymer microparticles have a crosslink density of 0.5% or more by mol.

After forming a dispersion liquid of polymer microparticles by inverse suspension polymerization according to the present invention, a dry powder of the polymer microparticles can be obtained using a known method. A method of obtaining a dry powder by heating the dispersion liquid as it is and then removing volatile components under a reduced pressure reduction, and a method comprising removing a dispersion stabilizer, unreacted monomers and the like by performing solid-liquid separation by filtration or centrifugal separation, and washing, and then performing drying, are selected. To perform a washing step is desirable because the primary dispersion property of the microparticles after drying increases.

Additionally, it is desirable to remove water before drying by azeotropic distillation or the like since the dispersing phase contains water. When the water is removed beforehand, it is possible to prevent particles from fusing at the time of drying and, as a result, the primary dispersion property of the particles after drying increases.

According to the present invention, it is possible to smoothly produce polymer particles having an average particle size in a saturated water-swollen state of 2 to 100 μm and a content ratio of particles having a particle size of 150 μm or larger in a saturated water-swollen state of 1.0% or less by weight. Such polymer particles can demonstrate its characteristics remarkably in various applications.

Furthermore, it is also possible to produce polymer particles having a water absorption ratio of 5 to 50 times, an average particle size in a saturated water-swollen state of 5 to 70 μm, and a content ratio of particles having a particle size of 150 μm or larger in a saturated water-swollen state of 0.3% or less by weight. The polymer will become polymer particles that lead to excellent characteristics in various applications.

It is noted that the water absorption ratio of the polymer microparticles, the average particle size in a state where the particle is saturated and swollen with water, and the content of a particle saturated and swollen with water having a particle size of 150 μm or larger in the present specification are values measured or determined by the methods described in the following Example section.

EXAMPLES

Hereinafter, the present invention is described in detail using Examples. In the following description, "part" means part by weight and "%" means % by weight.

Production Example 1

Production of Macromonomer Compositions UM-1 and UM-1HP

The temperature of an oil jacket of a 1,000-mL pressuring stirring tank type reactor with the oil jacket was kept at 240° C.

A monomer mixture liquid prepared in proportions of 75.0 parts of lauryl methacrylate (hereinafter referred to as "LMA") and 25.0 parts of acrylic acid (hereinafter referred to as "AA") as a monomer, 10.0 parts of methyl ethyl ketone (hereinafter referred to as "MEK") as a polymerization solvent, and 0.45 part of di-tert-butyl peroxide (hereinafter referred to as "DTBP") as a polymerization initiator was charged into a tank for starting material.

Feed of the monomer mixture liquid in the tank for starting material to a reactor was started, and the feed of the monomer mixture liquid and extraction of a reaction mixture liquid were carried out so that the weight of the contents within the reactor would be 580 g and the average residence time would be 12 minutes. The temperature in the reactor and the pressure in the reactor were adjusted to 235° C. and 1.1 MPa, respectively. The reaction mixture liquid extracted from the reactor was depressurized to 20 kPa and continuously fed to a thin-film evaporator maintained at 250° C. Thereby a macromonomer composition from which a monomer, a solvent and the like was distilled was discharged. The monomer, the solvent and the like that were distilled were cooled with a condenser and collected as a distillate. A time when 60 minutes had elapsed from a time when the temperature in the reactor had become stable at 235° C. after the start of the feed of the monomer mixture liquid was defined as a collection starting point, from which the reaction was continued for 48 minutes and then a macromonomer composition UM-1 was collected. During this period, 2.34 kg of the monomer mixture liquid was fed to the reactor, and 1.92 kg of the macromonomer composition was collected from the thin-film evaporator. Moreover, 0.39 kg of the distillate was collected in a distillation tank.

The distillate was analyzed by gas chromatography, and it was found that 100 parts by weight of the distillate contained 31.1 parts of LMA, 16.4 parts of AA, and 52.5 parts of the solvent and others.

From the amount and the composition of the monomer mixture liquid fed, the amount of the macromonomer composition collected, and the amount and the composition of distillate collected, the reaction rate of the monomer was calculated to be 90.2%, and the constitutional monomer composition ratio of the macromonomer composition UM-1 was calculated to be LMA to AA=76.0 to 24.0 (weight ratio).

The molecular weight of the macromonomer composition UM-1 was measured by gel permeation Chromatography (hereinafter referred to as "GPC") using tetrahydrofuran as an eluate and the polystyrene-equivalent weight average molecular weight (hereinafter referred to as "Mw") and the polystyrene-equivalent number average molecular weight (hereinafter referred to as "Mn") were 3,800 and 1,800,respectively. Additionally, the concentration of terminal ethylenically unsaturated bond in the macromonomer composition was determined through $^1$H-NMR measurement of the macromonomer composition. From the concentration of terminal ethylenically unsaturated bond obtained by $^1$H-NMR measurement, Mn obtained by GPC, and the constitutional monomer ratio, the introduction ratio of the terminal ethylenically unsaturated bond (hereinafter referred to as "F value") of the macromonomer composition UM-1 was calculated to be 97%.

The produced macromonomer composition UM-1 was dissolved by heating in an appropriate amount of n-heptane, and then n-heptane was added so that the solid concentration would become 30.0%±0.5%. Thus, n-heptane solution UM-1HP containing the macromonomer composition UM-1 was produced. The solid concentration was measured from a heat-calculated fraction after heating at 150° C. for one hour.

As to starting materials including a monomer, a polymerization solvent, a polymerization initiator and the like, commercially available industrial products were used as received without performing any treatment, such as purification.

Example 1

Production of Polymer Microparticles RT-1

For the preparation of the oil phase, the container was charged with 6.3 parts (1.9 parts in terms of pure content of UM-1) of the UM-1HP produced in Production Example 1 and 2.8 parts of sorbitan monooleate ("REODOL AO-10" manufactured by KAO Corp.) as a dispersion stabilizer and 554.5 parts of n-heptane as a polymerization solvent, which were stirred and mixed for 30 minutes while the solution was kept at a temperature of 40° C., and then the mixture was cooled to 20° C.

On the other hand, for the preparation of the aqueous phase, into another container were charged 100.0 parts of AA, 15.9 parts (equivalent to 2.0 mol % relative to a monofunctional monomer) of polyethylene glycol diacrylate ("ARONIX M-243" manufactured by TOAGOSEI CO., LTD., average molecular weight 425), and 95.0 parts of ion exchange water, which were stirred to be dissolved uniformly. Furthermore, while the mixed liquid was cooled so that the temperature thereof might be kept at 40° C. or lower, 70.8 parts of a 25% aqueous ammonia solution was added slowly to neutralize the mixed liquid. Thus, a monomer mixed liquid was obtained.

The prepared aqueous phase and the prepared oil phase were joined before the first dispersion tank and the mixture was supplied to a multistage dispersion tank. An emulsifier "ClearMix CLM-0.8S" manufactured by M Technique Co., Ltd. was arranged in the first dispersion tank, and a membrane emulsification apparatus manufactured by SPG Technology Co., Ltd. was arranged in the second dispersion tank. Shirasu porous glass (SPG) membrane (φ10×20 mm) was used for a microporous membrane in the membrane emulsification apparatus.

A reactor was equipped with a stirring system including one-tiered pitched paddle stirring blade, and further equipped with a thermometer, a nitrogen introduction tube, and a catalyst supply tube. Three of such reactors (all have a capacity of 200 ml) were arranged in tandem. Polymerization initiator was supplied from a supply tube on the side of the reactor.

After setting the stirring revolution speed of the emulsifier at 2,400 rpm, a pore size of the SPG membrane at 30 μm, and stirring blades of each tank reactor at 510 rpm, prepared oil phase was supplied at 300 g per minute, prepared aqueous phase was supplied at 150 g per minute, and "Percumyl H80" that is manufactured by NOF Corp. and is a n-heptane solution of 0.027 part of cumene hydroperoxide and 1.3 part of n-heptane) as an oil-soluble oxidizing agent was continuously supplied to the emulsifier, which is the first dispersion tank, at 1.3 g per minute. Internal temperature of the emulsifier was kept at 20° C. At this time, the volume fraction of the dispersing phase in the reaction tank is 25%. After passage of a membrane emulsification apparatus, nitrogen was blown into to the water-in-oil (W/O) type emulsion with adjusted dispersed-drop diameter to remove oxygen in the dispersion liquid, and the liquid was provided into the reactor while overflowing.

To the first reaction tank, an aqueous solution of 0.18 part of sodium (Na) hydrosulfite and 1.3 part of ion exchange water was added at 1.4 g per minute through an addition port mounted at the side of the reactor. On each wall surface of the reactor, n-heptane was supplied at 14 g per minute using a dispersion plate attached to a stirring shaft. Internal temperature of the first reaction tank was reached 35° C. at the time when three minutes had passed since the aqueous solution of sodium hydrosulfite was supplied. Into the second reaction tank, the above heptane solution of Percumyl H80 was added at 1.3 g per minute. Also, into the third reaction tank, Percumyl H80 was added at 1.3 g per minute. The residence time for each reactor was 20 seconds.

When the in-oil dispersion liquid which is a mixed liquid of polymer microparticles RT-1 and the oil phase was discharged from the reactor, the dispersion liquid was filtered using a filter having a mesh opening of 75 μm. Filterability was very good and the filtration was successfully completed without occlusion until the end. When the attachment of a resin to the inner wall surface of the reactor was checked after the discharge, the resin was slightly found at the vicinity of the liquid surface of the dispersion liquid and it was confirmed that the polymer microparticles RT-1 could be produced stably.

Figure 1:
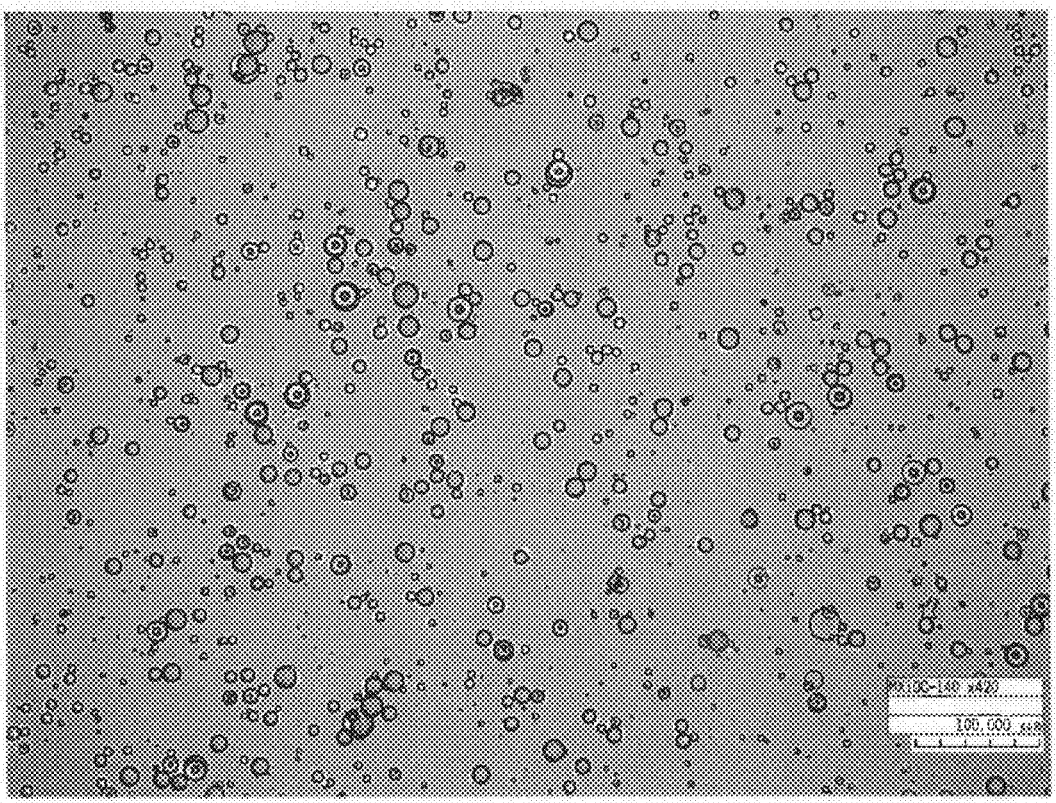
FIG. 1 is a microscope photograph of polymer microparticles RT-1 (after polymerization, in-oil dispersion)
Figure 2:
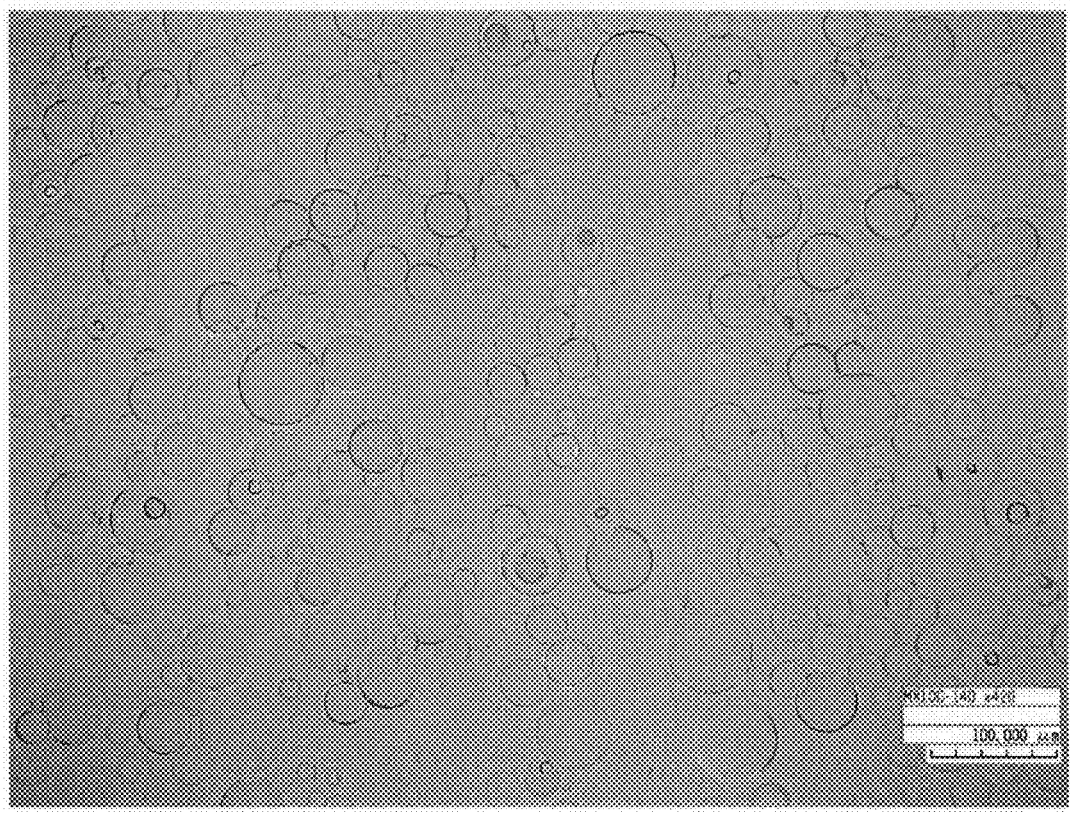
FIG. 2 is a microscope photograph of polymer microparticles RT-1 (after polymerization, in-water dispersion)

When a part of the in-oil dispersion liquid of RT-1 was sampled and was observed with a digital microscope ("KH-3000" manufactured by HIROX Co., Ltd.) at a magnification of 420, spherical microparticles having a distribution centering approximately 10 to 20 μm were observed. The photograph thereof is shown in FIG. 1. No aggregated particles composed of particles united together were observed. For a sample prepared by drying the in-oil dispersion liquid at 110° C. for one hour, the water absorption ratio (see the polymer microparticles analysis condition (2) below) was measured to be 20.2. When the dried sample was dispersed in an excessive amount of ion exchange water to be saturated and swollen and was observed at a magnification of 420, spherical microparticles having a distribution centering approximately 30 to 40 μm were observed. The photograph thereof is shown in FIG. 2. For the water-saturated-swollen particles RT-1, particle size distribution measurement (see the polymer microparticles analysis condition (3) below) was performed using a laser diffraction scattering type particle size distribution analyzer. The obtained particle size distribution had a single peak, and the water-saturated-swollen particle size was 35.2 μm based on volume and 19.3 μm based on number. It was confirmed that the polymer microparticles RT-1 had a water absorption capacity, kept spherical shape also when it was swollen due to water absorption, and was primarily dispersed in water. Moreover, for a sample prepared by heating the dispersion liquid of RT-1, thereby azeotropically distilling water and heptane contained in the particle to remove water to a dehydration degree of 95%, followed by removal of the solvent and powdering, the amount of a wet sieve residue (see the polymer microparticles analysis condition (4) below) was measured to be 0.02%. The polymer microparticles RT-1 were confirmed to contain no coarse particles greater than 150 μm also when they were saturated and swollen with water after the azeotropic dehydration.

Example 2

Production of Polymer Microparticles RT-2

Production was conducted in the same conditions as those in Example 1, except that stirring revolution speed was 4,500 rpm and a pore size of the SPG membrane was 20 μm.

Figure 3:
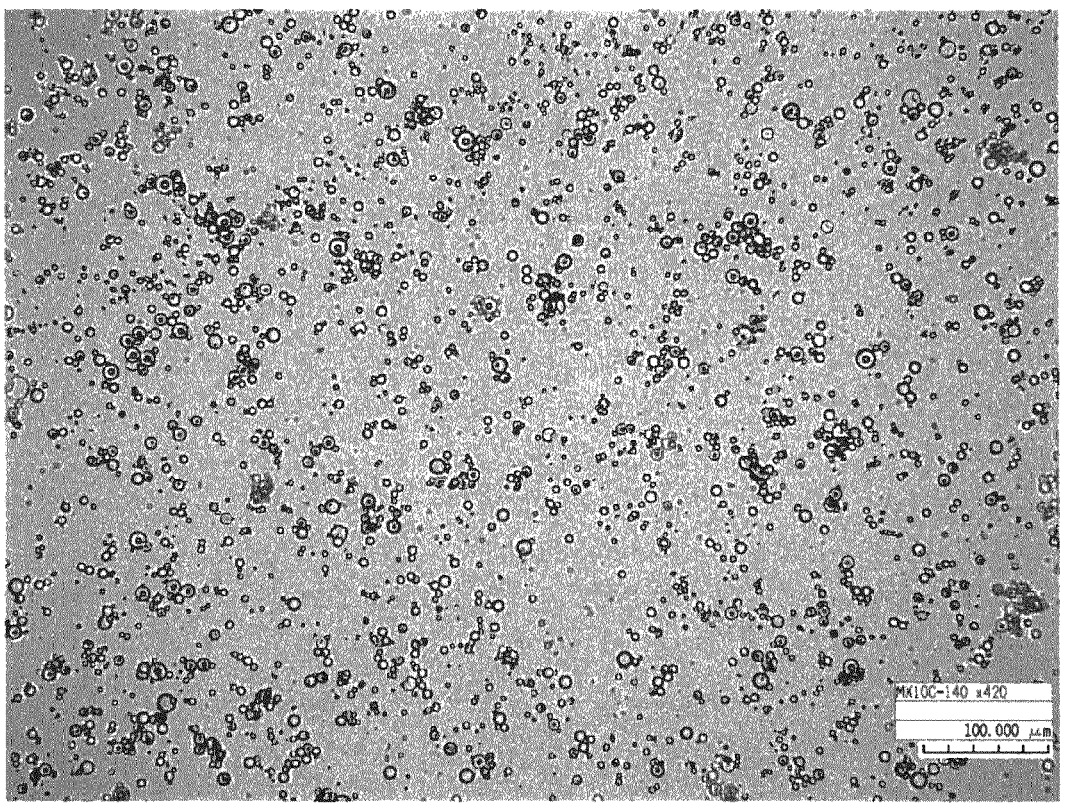
FIG. 3 is a microscope photograph of polymer microparticles RT-2 (after polymerization, in-oil dispersion)
Figure 4:
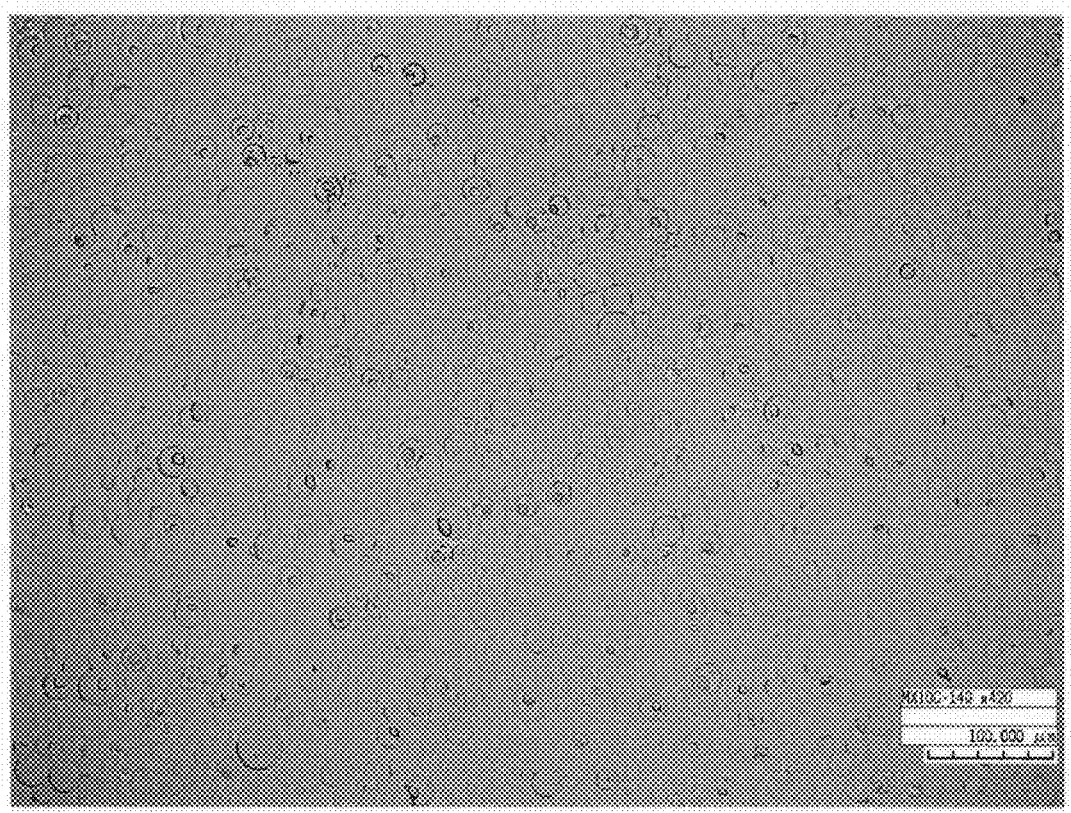
FIG. 4 is a microscope photograph of polymer microparticles RT-2 (after polymerization, in-water dispersion)

When a part of the in-oil dispersion liquid of RT-2 was sampled and was observed with a digital microscope ("KH-3000" manufactured by HIROX Co., Ltd.) at a magnification of 420, spherical microparticles having a distribution centering approximately 5 to 10 μm were observed. The photograph thereof is shown in FIG. 3. No aggregated particles composed of particles united together were observed. For a sample prepared by drying the in-oil dispersion liquid at 110° C. for one hour, the water absorption ratio (see the polymer microparticles analysis condition (2) below) was measured to be 18.1. When the dried sample was dispersed in an excessive amount of ion exchange water to be saturated and swollen and was observed at a magnification of 420, spherical microparticles having a distribution centering approximately 15 to 25 μm were observed. The photograph thereof is shown in FIG. 4. For the water-saturated-swollen particles RT-2, particle size distribution measurement (see the polymer microparticles analysis condition (3) below) was performed using a laser diffraction scattering type particle size distribution analyzer. The obtained particle size distribution had a single peak, and the water-saturated-swollen particle size was 19.1 μm based on volume and 15.5 μm based on number. Therefore, the ratio between the average particle size based on volume and the average particle size based on number, indicating a degree of sharpness of distribution was 1.23, being small. The range of the particle size distribution was in the range from 9 to 51 μm. It was confirmed that the polymer microparticles RT-2 have water absorbability, and maintain a spherical shape even after water-saturated and swollen state, and indicate primary dispersion in water.

Moreover, for a sample prepared by heating the RT-2, thereby azeotropically distilling water and heptane contained in the particles to remove water to a dehydration degree of 95%, followed by removal of the solvent and powdering, the amount of a wet sieve residue was measured to be 0.01% by weight. The microparticles RT-2 were confirmed to contain almost no coarse particles greater than 150 μm also when they had been saturated and swollen with water after the azeotropic dehydration.

When the in-oil dispersion liquid which is a mixed liquid of polymer microparticles RT-2 and the oil phase was discharged from the reactor, the dispersion liquid was filtered using a filter having a mesh opening of 75 μm. Filterability was very good and the filtration was successfully completed without occlusion until the end. When the attachment of a resin to the inner wall surface of the reactor was checked after the discharge, the resin was slightly found at the vicinity of the liquid surface of the dispersion liquid and it was confirmed that the polymer microparticles RT-2 could be produced stably.

Example 3

Production of Polymer Microparticles RT-3

The production was performed in the same conditions as those in Example 2 except that the residence time in the first reaction tank was 1 minute and that the supply of the water-in-oil (W/O) type emulsion and the supply of the polymerization initiator were ⅓ of the production case for RT-2. As a result, polymer microparticles were obtained having a swollen particle size, which is an average particle size based on volume of 14.1 μm and the ratio between the average particle size based on volume and the average particle size based on number of 1.23.

When the in-oil dispersion liquid which is a mixed liquid of polymer microparticles RT-3 and the oil phase was discharged from the reactor, the dispersion liquid was filtered using a filter having a mesh opening of 75 μm. Filterability was very good and the filtration was successfully completed without occlusion until the end. When the attachment of a resin to the inner wall surface of the reactor was checked after the discharge, the resin was slightly found at the vicinity of the liquid surface of the dispersion liquid and it was confirmed that the polymer microparticles RT-3 could be produced stably.

Example 4

Production of Polymer Microparticles RT-4

The production was performed in the same conditions as those in Example 3 except that the residence time in the first reaction tank was 5 minutes and that the volume of the first reaction tank was 1,000 ml. As a result, polymer microparticles were obtained having a swollen particle size, which is an average particle size based on volume of 15.0 μm and the ratio between the average particle size based on volume and the average particle size based on number of 1.25.

When the in-oil dispersion liquid which is a mixed liquid of polymer microparticles RT-4 and the oil phase was discharged from the reactor, the dispersion liquid was filtered using a filter having a mesh opening of 75 μm. Filterability was very good and the filtration was successfully completed without occlusion until the end. When the attachment of a resin to the inner wall surface of the reactor was checked after the discharge, the resin was slightly found at the vicinity of the liquid surface of the dispersion liquid and it was confirmed that the polymer microparticles RT-4 could be produced stably.

Example 5

Production of Polymer Microparticles RT-5

The production was performed in the same conditions as those in Example 3 except that the residence time in the first reaction tank was 10 minutes and that the volume of the first reaction tank was 2,000 ml. As a result, polymer microparticles were obtained having a swollen particle size, which is an average particle size based on volume of 14.2 μm and the ratio between the average particle size based on volume and the average particle size based on number of 1.32.

When the in-oil dispersion liquid which is a mixed liquid of polymer microparticles RT-5 and the oil phase was discharged from the reactor, the dispersion liquid was filtered using a filter having a mesh opening of 75 μm. Filterability was very good and the filtration was successfully completed without occlusion until the end. When the attachment of a resin to the inner wall surface of the reactor was checked after the discharge, the resin was slightly found at the vicinity of the liquid surface of the dispersion liquid and it was confirmed that the polymer microparticles RT-5 could be produced stably.

Example 6

Production of Polymer Microparticles RT-6

The production was performed in the same conditions as those in Example 3 except that the residence time in the first reaction tank was 30 minutes, that the volume of the first reaction tank was 3,000 ml and that the supply of the water-in-oil (W/O) type emulsion and the supply of the polymerization initiator were ½ of the production case for RT-3. As a result, polymer microparticles were obtained having a swollen particle size, which is an average particle size based on volume of 14.2 μm and the ratio between the average particle size based on volume and the average particle size based on number of 1.24.

When the in-oil dispersion liquid which is a mixed liquid of polymer microparticles RT-6 and the oil phase was discharged from the reactor, the dispersion liquid was filtered using a filter having a mesh opening of 75 μm. Filterability was very good and the filtration was successfully completed without occlusion until the end. When the attachment of a resin to the inner wall surface of the reactor was checked after the discharge, substantial attachment was confirmed at the area having contact with a liquid level of the dispersion liquid and at an outlet port pipe of the tank.

Example 7

Production of Polymer Microparticles RT-7

The production was performed in the same conditions as those in Example 3 except that the residence time in the first reaction tank was 60 minutes, that the volume of the first reaction tank was 3,000 ml and that the supply of the water-in-oil (W/O) type emulsion and the supply of the polymerization initiator were ¼ of the production case for RT-3. As a result, polymer microparticles were obtained having a swollen particle size, which is an average particle size based on volume of 13.4 μm and the ratio between the average particle size based on volume and the average particle size based on number of 1.31.

When the in-oil dispersion liquid which is a mixed liquid of polymer microparticles RT-7 and the oil phase was discharged from the reactor, the dispersion liquid was filtered using a filter having a mesh opening of 75 μm. Filterability was very good and the filtration was successfully completed without occlusion until the end. When the attachment of a resin to the inner wall surface of the reactor was checked after the discharge, substantial attachment was confirmed at the area having contact with a liquid level of the dispersion liquid and at an outlet port pipe of the tank.

Example 8

Production of Polymer Microparticles RT-8

The production was performed in the same conditions as those in Example 2 except that the volume fraction of the dispersing phase in the reaction tank was 30%. As a result, polymer microparticles were obtained having a swollen particle size, which is an average particle size based on volume of 18.5 μm, and a particle size based on number of 11.8 μm. Therefore, the ratio between the average particle size based on volume and the average particle size based on number was calculated to be 1.57, being large and the particle size was in the range from 8 to 262 μm.

Example 9

Production of Polymer Microparticles RT-9

The production was performed in the same conditions as those in Example 2 except that "Perbutyl H69" manufactured by NOF Corp. (a 69% solution of tert-butyl hydroperoxide) was used as the oxidizing agent. As a result, polymer microparticles were obtained having a swollen particle size, which is an average particle size based on volume of 19.2 μm, and a particle size based on number of 14.7 μm. Therefore, the ratio between the average particle size based on volume and the average particle size based on number was calculated to be 1.31, being large and the particle size was in the range from 9 to 133 μm.

Example 10

Production of Polymer Microparticles RT-10

Ammonium persulfate was used as the oxidizing agent. The production was performed in the same conditions as those in Example 3 except that the residence time in the first reaction tank was 30 minutes, that the volume of the first reaction tank was 3,000 ml and that the supply of the water-in-oil (W/O) type emulsion and the supply of the polymerization initiator were ½ of the production case for RT-3. As a result, polymer microparticles were obtained having a swollen particle size, which is an average particle size based on volume of 11.5 μm, a particle size based on number of 8.60 μm, the ratio between the average particle size based on volume and the average particle size based on number of 1.34, and the particle size range from 5 to 34 μm.

When the in-oil dispersion liquid which is a mixed liquid of polymer microparticles RT-10 and the oil phase was discharged from the reactor, the dispersion liquid was filtered using a filter having a mesh opening of 75 μm. Filterability was very good and the filtration was successfully completed without occlusion until the end. When the attachment of a resin to the inner wall surface of the reactor was checked after the discharge, substantial attachment was confirmed at the area having contact with a liquid level of the dispersion liquid and at an outlet port pipe of the tank.

Comparative Example 1

Production of Polymer Microparticles RT-11

The production was performed in the same conditions as those in Example 3 except that a tubular reactor was used instead of the tank reactor. And the residence time was 1 minute which is the same as that in Example 3. As a result, polymer microparticles were obtained having a swollen particle size, which is an average particle size based on volume of 14.7 μm and the ratio between the average particle size based on volume and the average particle size based on number of 1.31. The first reaction tube and an outlet port pipe of the reaction tube were occluded 60 minutes after the initiation of polymerization.

Comparative Example 2

Production of Polymer Microparticles RT-12

The production was performed in the same conditions as those in Example 2 except that the aqueous phase was supplied to the reaction tank without pre-emulsification. As a result, gel was generated in the reaction tank immediately after the initiation of polymerization, thus the polymerization was aborted.

TABLE 1

|  | Residence time in first reaction tank | Volume fraction in dispersing phase | Oxidizing agent | Polymerization System | Volume based average size (μm) | Ratio of volume based to number based |
|---|---|---|---|---|---|---|
| Example 1 | 20 seconds | 25 vol % | Percumyl H | Continuous stirred tank reactor | 35.2 | 1.82 |
| Example 2 | 20 seconds | 25 vol % | Percumyl H | Continuous stirred tank reactor | 19.1 | 1.23 |

TABLE 1-continued

| | Residence time in first reaction tank | Volume fraction in dispersing phase | Oxidizing agent | Polymerization System | Volume based average size (μm) | Ratio of volume based to number based |
|---|---|---|---|---|---|---|
| Example 3 | 1 minute | 25 vol % | Percumyl H | Continuous stirred tank reactor | 14.1 | 1.23 |
| Example 4 | 5 minutes | 25 vol % | Percumyl H | Continuous stirred tank reactor | 15 | 1.25 |
| Example 5 | 10 minutes | 25 vol % | Percumyl H | Continuous stirred tank reactor | 14.2 | 1.32 |
| Example 6 | 30 minutes | 25 vol % | Percumyl H | Continuous stirred tank reactor | 14.2 | 1.24 |
| Example 7 | 60 minutes | 25 vol % | Percumyl H | Continuous stirred tank reactor | 13.4 | 1.31 |
| Example 8 | 20 seconds | 30 vol % | Percumyl H | Continuous stirred tank reactor | 18.5 | 1.57 |
| Example 9 | 20 seconds | 25 vol % | Perbutyl H | Continuous stirred tank reactor | 19.2 | 1.31 |
| Example 10 | 30 minutes | 25 vol % | Ammonium persulfate | Continuous stirred tank reactor | 11.5 | 1.34 |
| Comparative Example 1 | 1 minute | 25 vol % | Percumyl H | Tubular reactor | 14.7 | 1.31 |
| Comparative Example 2 | 20 seconds | 25 vol % | Percumyl H | Continuous stirred tank reactor | No data due to gelation | No data due to gelation |

The polymer microparticles analysis conditions (1) to (4) used in Examples are as follows.

(1) Solid Concentration

The weight (a) of about 1 g of a sample was measured, the weight (b) of a residue after drying in a windless oven at a temperature of 150° C. for 60 minutes was measured, and then the solid concentration was calculated by the following equation. For the measurement a weighing bottle was used. Other operations were performed in accordance with JIS K0067-1992 (Test methods for loss and residue of chemical products).

Solid concentration (%)=($b/a$)×100

(2) Water absorption ratio

The water absorption ratio was measured according to the following method. The measuring device is illustrated in FIG. 5.

Figure 5:
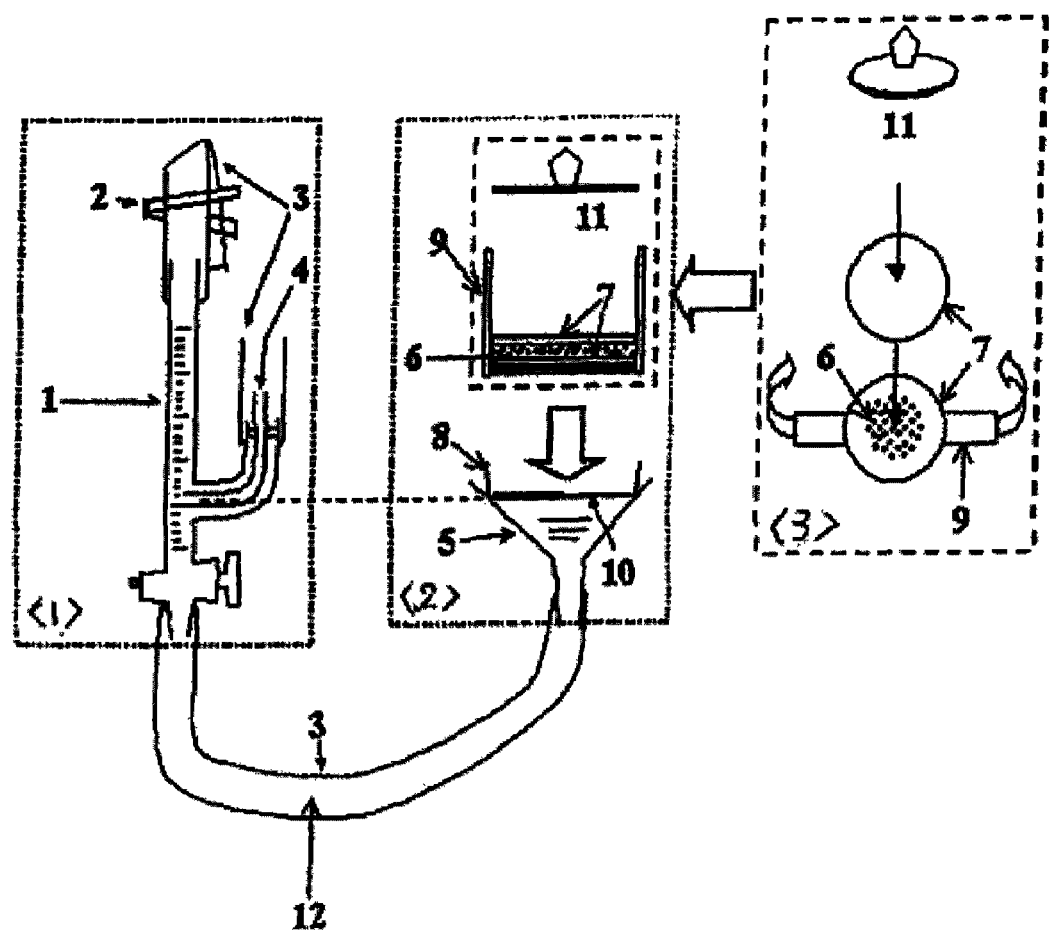
FIG. 5 is a diagram showing an apparatus for the measurement of the water absorption ratio of polymer microparticles.

The measuring device is composed of <1> to <3> shown in FIG. 5. <1> is consisting of a burette 1 having a branch pipe for air ventilation, a pinch cock 2, a silicone tube 3, and a polytetrafluoroethylene tube 4.

In <2>, a supporting cylinder 8 having many holes in its bottom is mounted on a funnel 5, and a filter paper 10 for device is mounted thereon.

In <3>, a sample 6 of the polymer microparticles is inserted into two filter papers 7 for fixing sample, and the filter papers for fixing sample are fixed with an adhesive tape 9. All the filter papers to be used are "ADVANTEC No.2" having an inner diameter of 55 mm.

<1> and <2> are linked with the silicone tube 3.

The levels with respect to the burette 1 of the funnel 5 and the supporting cylinder 8 are fixed, and the lower end of the polytetrafluoroethylene tube 4 disposed within the burette branch pipe and the bottom of the supporting cylinder 8 are set to be at the same level (dotted line in FIG. 5)

The measuring method is described below.

The pinch cock 2 in <1> was released, and ion exchange water was charged from the top of the burette 1 through the silicone tube 3 so that the space from the burette 1 to the filter paper 10 for device was filled with ion exchange water 12. Subsequently, the pinch cock 2 was closed and air was removed through the polytetrafluoroethylene tube 4 connected to the burette branch pipe with a rubber stopper. Thus, a condition was obtained such that ion exchange water 12 was continuously fed from the burette 1 to the filter paper 10 for device.

After that, excess ion exchange water 12 which oozed from the filter paper 10 for device was removed, and then a read graduation (a) of the burette 1 was recorded.

A dry powder was sampled in an amount of 0.1 to 0.2 g, and then the powder was placed uniformly on the center of the filter paper 7 for fixing sample as illustrated in <3>. Another filter paper was used to sandwich the sample and the two filter papers were adhered with an adhesive tape 9 to fix the sample. The filter papers between which the sample was fixed were put on the filter paper 10 for device as illustrated in <2>.

Subsequently, a read graduation (b) of the burette 1 after a lapse of 30 minutes from a time when a lid 11 was put on the filter paper 10 for device was recorded.

The total (c) of the water absorption of the sample and the water absorption of the two filter papers 7 for fixing sample was calculated by (a−b). By the same operation, the water absorption (d) of only the two filter papers 7 containing no water-absorptive polymer sample was measured.

The above-mentioned operations were performed and a water absorption ratio was calculated from the following equation. As to the solid concentration to be used for the calculation, a value measured by the method (1) was used.

Water absorption ratio (times)=($c-d$)/{Weight of sample (g)×(Solid concentration (%)/100)}+100/(Solid concentration (%))

(3) Water-swollen Particle Size

To 0.02 g of a sample for measurement was added 20 ml of ion exchange water, followed by shaking well. Thus, the sample was dispersed uniformly. For a dispersion liquid resulting from dispersion continued for 30 minutes or more in order to bring the polymer microparticles into a water-saturated-swollen state, the particle size distribution was measured after one-minute application of ultrasonic wave by using a laser diffraction scattering type particle size distribution analyzer ("MT-3000" manufactured by NIKKISO CO., LTD.). Ion exchange water was used as a circulated dispersion medium used in the measurement and the refractive index of the dispersion was adjusted to 1.53. The median diameter (μm) was calculated from the particle size distribution on volume basis obtained by the measurement, and it was defined as a water-swollen particle size.

(4) Measurement of Amount of Particle having Water-swollen Particle Size of 150 µm or Larger (a Wet Sieving Residue Method)

Measurement was performed in accordance with JIS K 0069-1992 (test method for sieving of chemical products).

A sample in an amount corresponding to 50 g in terms of solid concentration was weighed and ethanol was added thereto in the same amount as the sample to loosen well. Then the liquid was poured slowly into 3.0 liters of ion exchange water under stirring and stirred for 30 minutes to prepare a water-swollen dispersion liquid of the sample. After confirmation of the uniform dispersion, the dispersion liquid was poured onto a sieve having a diameter of 70 mm and a mesh opening of 150 µm and allowed to pass therethrough. The residue on the sieve was washed with a sufficient amount of water while taking care that the residue does not spill off. Subsequently, the sieve after measurement was dried in a circulation dryer at a temperature of 150° C. for 30 minutes and cooled in a desiccator, and then the weight of the sieve after drying (the total weight of the sieve and the residue) was measured.

The wet sieve residue (%) calculated by the following formula was defined as the amount of particle having a water-swollen particle size of 150 µm or larger. Operations other than those described above were performed in accordance with JIS K 0069-1992 (test method for sieving of chemical products).

Wet sieve residue (%)=(Weight of sieve after test−Weight of sieve)/{(Weight of sample used×(Solid concentration/100))}×100

Clearly from the results above, attachment of the resin to a wall of the reactor during polymerization was not observed and filtability of the polymer slurry was favorable in the present production method. And it was confirmed that polymer microparticles uniform in particle size could be produced in a good productivity without the occurrence of particle aggregation.

On the other hand, in Comparative Example 1 wherein a tubular reactor was used, attachment to the pipe caused by aggregation of polymer microparticles was occurred with progress of the polymerization, and then, inside of the reaction tube was occluded in a short time after the initiation of the reaction.

INDUSTRIAL APPLICABILITY

According to the production method of the present invention, a high-quality spherical hydrophilic polymer microparticles remarkably higher uniform in particle size than those by conventional technologies can be produced at high productivity while keeping high dispersion stability and polymerization stability without causing aggregation, clumping and adhesion to a polymerization apparatus of particles during or after polymerization. Moreover, according to the production method of the present invention, even if a particle having a high degree of crosslinking is produced using a large amount of a multifunctional vinyl-based monomer, a high-quality hydrophilic crosslinked polymer microparticles uniform in particle size can be produced at high productivity without causing aggregation, clumping and adhesion to a polymerization apparatus of particles.

What is claimed is:

1. A method for the production of polymer microparticles by inverse suspension polymerization of a vinyl-based monomer, said method comprising: preparing in a dispersing tank, a water-in-oil (W/O) type emulsion in which an organic solvent is a continuous phase and an aqueous solution of a vinyl-based monomer is a dispersing phase, and conducting the inverse suspension polymerization while feeding said water-in-oil (W/O) type emulsion to a continuous stirred tank reactor.

2. The method for the production of polymer microparticles according to claim 1, wherein a redox polymerization catalyst comprising an oxidizing agent and a reducing agent is used as a polymerization initiator.

3. The method for the production of polymer microparticles according to claim 2, wherein said oxidizing agent is an oil-soluble oxidizing agent.

4. The method for the production of polymer microparticles according to any one of claim 1, wherein said reactor comprises at least two continuous stirred tank reactors serially-connected.

5. The method for the production of polymer microparticles according to claim 1, wherein a residence time of a reaction liquid in at least a first reaction tank is ten minutes or shorter.

6. The method for the production of polymer microparticles according to claim 1, wherein a ratio of said dispersing phase in each reaction liquid in the respective reaction tank is 30% or less by volume.

7. The method for the production of polymer microparticles according to claim 1, wherein said water-in-oil (W/O) type emulsion is prepared using a dispersing tank which has at least one stirring apparatus and at least one membrane emulsification apparatus.

8. The method for the production of polymer microparticles according to claim 7, wherein said water-in-oil (W/O) emulsion is deaerated after passing said membrane emulsification apparatus.

9. The method for the production of polymer microparticles according to claim 1, wherein a continuous phase component is continuously fed to a wall of a gas phase of said continuous stirred tank reactor.

10. The method for the production of polymer microparticles according to claim 2, wherein an oxidizing agent or a reducing agent is mixed with said water-in-oil (W/O) emulsion in said dispersing tank.

11. The method for the production of polymer microparticles according to claim 1, wherein a water-in-oil (W/O) emulsior is prepared which has an average particle size of said dispersing phase of 100 µm or less in said dispersing tank.

12. The method for the production of polymer microparticles according to claim 1, wherein a macromonomer having a radically polymerizable unsaturated group at an end of a polymer derived from a vinyl-based monomer is used as a dispersion stabilizer.

13. The method for the production of polymer microparticles according to claim 1, wherein at least one part of said vinyl-based monomer has a polar group selected from the group consisting of a carboxyl group, a sulfone group and an amide group.

14. The method for the production of polymer microparticles according to claim 1, wherein said vinyl-based monomer contains a multifunctional vinyl monomer having two or more radical polymerizable unsaturated groups.

15. The method for the production of polymer microparticles according to claim 14, wherein a molar ratio of a monofunctional vinyl monomer and said multifunctional vinyl monomer is 100:0.1 to 100:10.

16. The method for the production of polymer microparticles according to claim 1, wherein said polymer microparticles produced by inverse suspension polymerization are polymer microparticles having a crosslinking density of 0.5% or more by mol.

17. The method for the production of polymer microparticles according to claim 1, wherein said polymer microparticles produced by inverse suspension polymerization are polymer microparticles which have an average particle size in a saturated water-swollen state of 2 to 100 μm, and a content ratio of particles having a particle size of 150 μm or larger in a saturated water-swollen state of 1.0% or less by weight.

18. The method for the production of polymer microparticles according to claim 1, wherein said polymer microparticles produced by inverse suspension polymerization are polymer microparticles which have a water absorption ratio of 5 to 50 times, an average particle size in a saturated water-swollen state of 5 to 70 μm, and a content ratio of particles having a particle size of 150 μm or larger in a saturated water-swollen state of 0.3% or less by weight.

* * * * *